United States Patent [19]

Gesten

[11] Patent Number: 4,546,947
[45] Date of Patent: Oct. 15, 1985

[54] KEYBOARD DUST COVER HAVING INTEGRAL COPYHOLDER

[76] Inventor: Jeffrey Gesten, 6271 Red Cedar Cir., Lake Worth, Fla. 33463

[21] Appl. No.: 589,897

[22] Filed: Mar. 15, 1984

[51] Int. Cl.⁴ .............................................. B41J 11/02
[52] U.S. Cl. .................... 248/442.2; 248/460; 312/284; 312/327; 400/718
[58] Field of Search ............... 248/442.2, 441.1, 460, 248/461; 70/159, 160, 57; 312/284, 327, 328; 400/713, 714, 718, 718.1, 718.2; 340/365 VL

[56] References Cited

U.S. PATENT DOCUMENTS

| | | | |
|---|---|---|---|
| 412,221 | 10/1889 | Allen | 248/442.2 X |
| 485,471 | 11/1892 | Morrison | 248/441 |
| 966,941 | 8/1910 | Murray | 248/441 |
| 1,214,076 | 1/1917 | Rice | 248/448 |
| 1,236,050 | 8/1917 | Caldwell | 248/441 |
| 1,370,737 | 3/1921 | Furrey | 248/442.2 |
| 1,375,731 | 4/1921 | Restrepo | 248/442.2 X |
| 1,531,540 | 3/1925 | Calero | 248/441 |
| 1,615,859 | 2/1927 | Slavik | 248/442.2 |
| 2,317,821 | 4/1943 | Stein | 248/441 |
| 2,505,814 | 5/1950 | Voorhorst | 248/442.2 |
| 2,574,575 | 11/1951 | MacIntyre | 248/442.2 |
| 2,650,568 | 9/1953 | Voorhorst | 248/442.2 |
| 3,415,300 | 12/1968 | Worcester | 248/205.2 X |
| 3,482,910 | 12/1969 | Debelius | 16/374 X |
| 3,624,317 | 11/1971 | Buckingham | 70/57 X |
| 3,774,984 | 11/1973 | Banko et al. | 312/284 X |
| 4,026,415 | 5/1977 | Sarley | 211/60 T X |
| 4,162,055 | 7/1979 | Summers | 248/441 |
| 4,190,929 | 3/1980 | Palka | 16/DIG. 13 X |
| 4,478,005 | 10/1984 | Mundschenk | 312/327 X |

OTHER PUBLICATIONS

Data Terminal Keyboard and Dust Cover, Technical Digest, No. 64, Prince et al., Oct. 1981.

Primary Examiner—J. Franklin Foss
Assistant Examiner—David L. Talbott
Attorney, Agent, or Firm—Eugene F. Malin

[57] ABSTRACT

A cover and copyholder for a keyboard housing includes a planar cover body pivotally attached by one edge to a rear edge of the keyboard housing, and movable between a first position in which the cover body protectively overlies the keyboard as a dust cover, and a second position in which the cover body is supported in an upright position. A receptacle for supporting a paper is mounted on the underside of the cover body, the paper being placed in plain view when the cover is lifted into the second position. The cover mount is easily removed from the keyboard housing. A paper supporting extension may be raised from the free edge of the cover to support longer sheets.

10 Claims, 6 Drawing Figures

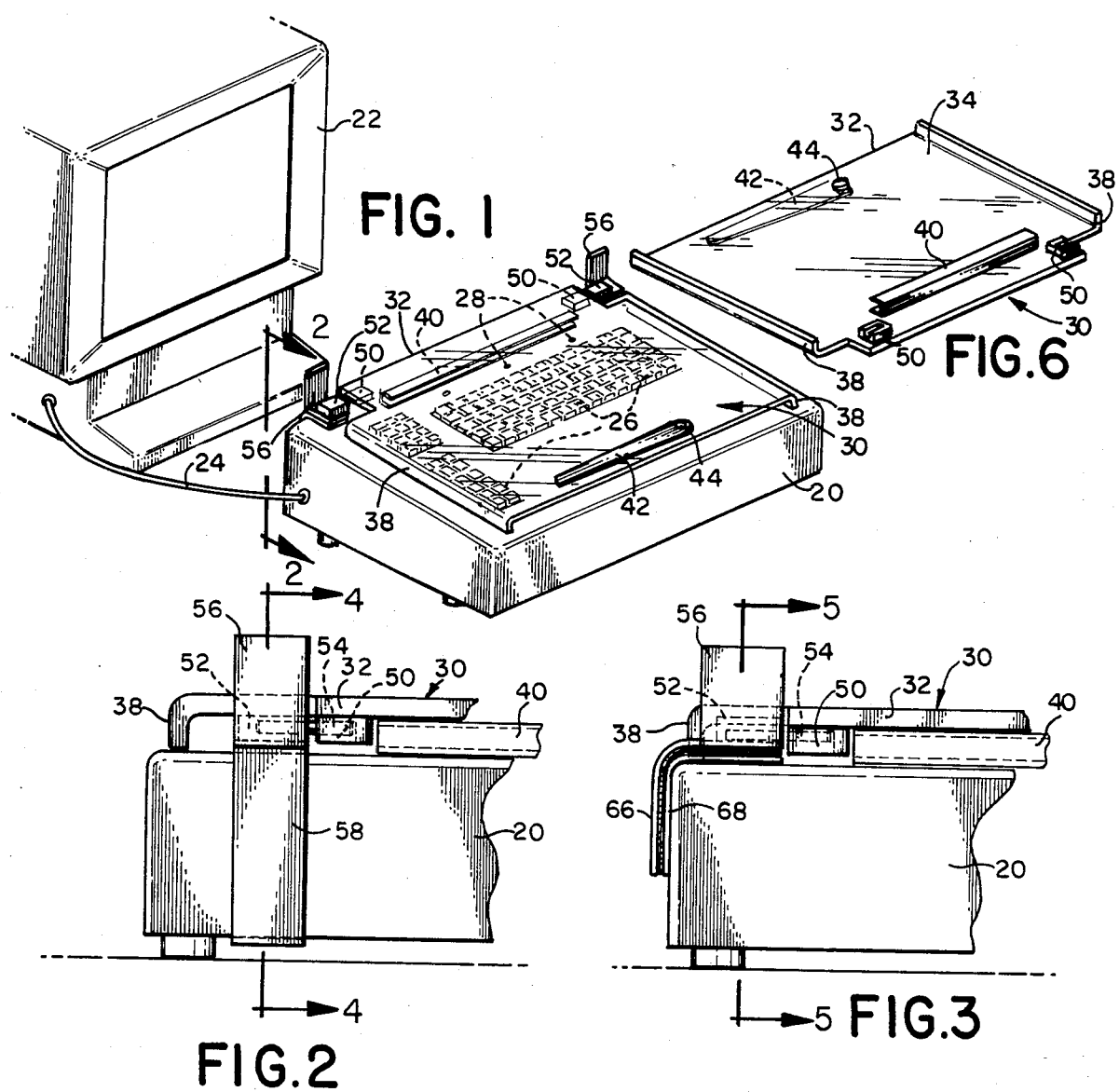
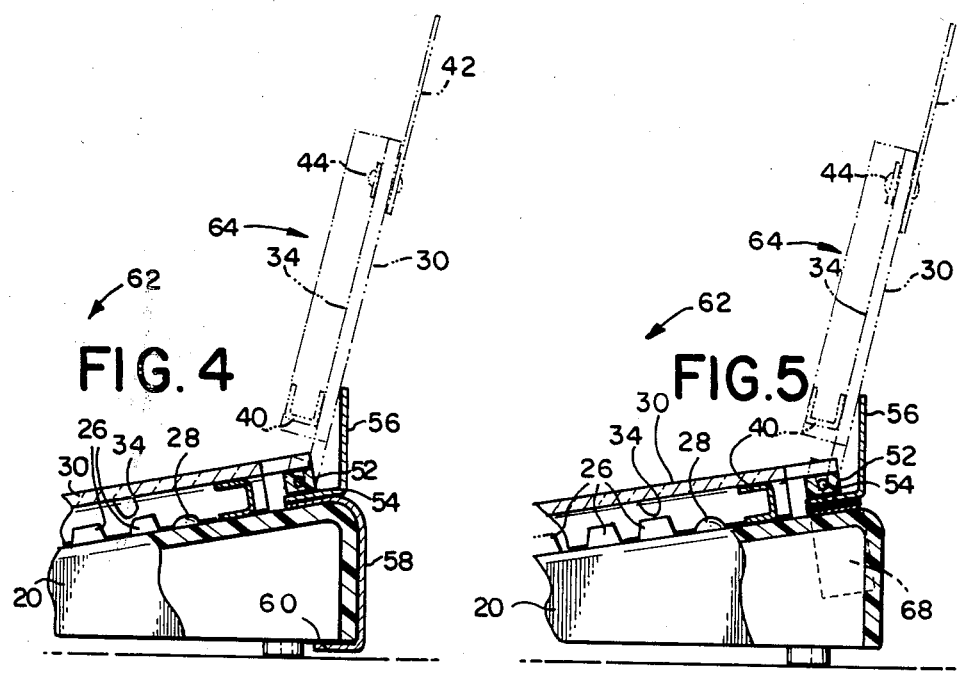

KEYBOARD DUST COVER HAVING INTEGRAL COPYHOLDER

BACKGROUND OF THE INVENTION

1. Field of the Invention

The present invention relates to the two fields of keyboard covers and copyholders, and in particular to a copy-holding dust cover for a keyboard such as a computer keyboard, word processor keyboard or the like.

2. Description of the Prior Art

Various copyholders, book holders and music stands are known for supporting a copy such as a sheet of paper in an upright or somewhat-inclined position for viewing. In U.S. Pat. Nos. 2,505,814 and 2,650,658, both to Voorhorst, a free standing pivotal copyholder device is positioned immediately to the rear of a typewriter, for holding a paper in the typist's view. With typewriters, the blank sheet to be typed and/or the finished sheet extend upwards from a platen at the rear of the device. The blank sheet will cover at least a portion of such a copyholder unless the copyholder is positioned well above the keys. On the other hand, placing a copyholder closer to the typist causes the copyholder to obstruct view of the keys or the typed sheet, or both. For these reasons, copyholders are normally placed to one side of the keyboard.

In U.S. Pat. No. 2,574,575-MacIntyre, a device for feeding copies is pivotally positionable in an upright position, where it feeds and then receives sheets of paper to be typed. The feeder pivots to a lowered position for storage. Although both the Voorhorst and MacIntyre devices may be folded down over the typewriter, neither device tends to protect the keyboard from dust or the like, and both are associated with the paper in the area of the platen.

Copyholders which do not purport to assist in protecting a typewriter from dirt are shown, for example in U.S. Pat. No. 2,317,821-Stein, U.S. Pat. No. 1,615,959-Slavik and U.S. Pat. No. 1,370,737-Furrey. A number of alternatives are disclosed in these patents for positioning the copyholder where required, usually well clear of the keyboard, for example, to the side. In the patent the Furrey, for training beginner typists, the copyholder may be positioned at a space above the keys to conceal the keys from the typist.

The present invention relates to a dust cover/copyholder which is particularly adapted for use with keyboards for data processing machines, computers and the like. In such machines, no paper is fed or produced at the keyboard housing itself. There is nevertheless a need for supporting copies of various description, such as text, flowcharts, character code listings and the like.

Keyboards for electronic equipment such as computers are frequently associated with a CRT display. The display often is not rigidly or physically attached to the keyboard device. By attaching the dust cover/copyholder of the invention to the rear of the keyboard, the user can conveniently position the copy to be typed in close proximity to the keyboard and also in close proximity to the CRT display. Therefore, the copyholder allows for efficient typing.

The dust cover/copyholder of the invention efficiently protects the keyboard from dirt and the like, while allowing normal access of air to all the surfaces of the keyboard except the upper, dust-accumulating surface. In this respect, the invention is superior to dust covers in the form of inverted bags or boxes which cannot be left on the keyboard housing of an electric device while the device is on, without danger of undue heat. Using the invention, power can remain on and an ongoing program or the like can be run with the keyboard nevertheless protected from dust.

Although the invention indeed includes a copyholder having some features of known copyholders such as an inclined, paper-supporting surface, the invention is positioned in an unconventional manner, with unsuspected benefits over the copyholders known for use with typewriters. The invention is nevertheless unobtrusive in that the dust cover/copyholder is removably attached to the housing and is preferably comprised of a transparent or semi-transparent material, and does not block view of status-indicating lights which may be mounted on the keyboard. If the cover is raised, the CRT near which the keyboard is likely to be placed likewise remains in view either alongside or through the cover of the invention.

SUMMARY OF THE INVENTION

It is an object of the invention to protect an electronic keyboard from dust, while simultaneously providing a convenient means for holding copies of text, diagrams or the like.

It is also an object of the invention to provide a movable copyholder adapted for protecting electronic keyboards which is unobtrusive, attractive and useful.

It is another object of the invention to provide a dust cover/copyholder which does not interfere with the keyboard and precludes accidental operation of the keys, without accumulation of undue heat.

It is still another object of the invention to provide an inexpensive, attractive and convenient dust cover for an electronic keyboard which easily and dependably holds copies in plain view of the user.

These and other objects are accomplished by a cover and copyholder for a keyboard housing including a planar cover body pivotally attached by one edge to a rear edge of the keyboard housing, and movable between a first position in which the cover body protectively overlies the keyboard as a dust cover, and a second position in which the cover body is supported in an upright position. A receptacle for supporting a paper is mounted in the underside of the cover body, being placed in plain view when the cover is lifted into the second position. The cover mount is easily removed from the keyboard housing. A paper supporting extension may be raised from the free edge of the cover to support longer sheets.

BRIEF DESCRIPTION OF THE DRAWINGS

There are shown in the drawings the embodiments which are presently preferred. It should be understood, however, that the invention is not limited to the precise arrangements and instrumentalities shown in the drawing, wherein:

FIG. 1 is a perspective view of an electronic device having a keyboard and CRT, equipped with the dust cover of the invention;

FIG. 2 is a partial rear elevation view of the keyboard housing and dust cover, taken along lines 2—2 in FIG. 1;

FIG. 3 is a partial rear elevation view of an alternative embodiment, also taken along lines 2—2 in FIG. 1;

FIG. 4 is a partial section view taken along lines 4—4 in FIG. 2;

FIG. 5 is a partial section view taken along lines 5—5 in FIG. 3; and,

FIG. 6 is a perspective view of the dust cover body of the invention showing the underside thereof as compared to FIG. 1.

DETAILED DESCRIPTION OF THE PREFERRED EMBODIMENTS

The device of the invention is shown generally in its keyboard-protective position in FIG. 1. Cover 30 is placed to overlie keyboard housing 20 when positioned downward, to thereby protect the keys 26 from dust, spilled drinks and the like. The cover 30 may be placed in the protective position shown in FIG. 1 when the device is off, or the cover may be put in place when the machine in running, but no keyboard input is desired or required. Keyboard housing 20 and the keys 26 and indicator lights 28 mounted therein are connected to a CRT display 22 by means of cable 24. The system may also have a printer. Due to attachment of the CRT and keyboard housing by cable 24, there is a range of mobility of keyboard housing 20 with respect to CRT 22 screen and also the printer (not pictured).

Should the user desire to access keys 26, cover 34 may be pivoted by a hinge means upwards, whereupon, depending upon the location of keyboard housing 20, cover 30 may be positioned in front of CRT 22. Cover 30 is preferably a transparent or nearly-transparent cover, whereby CRT 22 is not necessarily obstructed. Similarly, indicator lights 28 can be seen through the cover while the machine is on, and the cover at its lowered position.

Cover 30 comprises a planar body portion 22, overlying and covering the expanse of the keyboard. At least a part of the side edges 38 of cover 30 are provided with spacers, for example the edges 38, which provide the basic support for cover 30 on keyboard housing 20. Accordingly, the underside 34 of cover 30 does not rest directly against keys 26, but is spaced slightly therefrom.

The pivotable connection of cover 30 and keyboard housing 20 is achieved by means of at least one pivot pin 54, mounted near the rear of keyboard housing 20, such that cover 30 can be pivoted upwards and to the rear around the upper rear edge of the keyboard housing. A pivot block 50 attached to the cover, and a pivot block 52, attached to the keyboard housing, both engage pivot pin 54. Preferably, the pivot block 50 attached to the cover 30 is rigidly affixed, while the pivot block 52 attached to the housing, is removable from the housing. Upon removing attachment members 36, the blocks 52 on the attachment portions may be removed from the pivot pin. Alternatively, the blocks 50, 52 may be provided with slots for engaging the pivot pin, such that the pivot pin can be laterally inserted rather than inserted end-wise. In this manner, the cover 30 can be removed from the attachment devices 36, without requiring that the attachment devices be removed from the keyboard housing 20.

Each attachment device 36 comprises an abutment 56, extending substantially perpendicularly upwards, to limit the range to which cover 30 can pivot backwards around pivot pin 54. Abutment portions 56 may be of plastic or resilient metal, and should extend upwards for a short distance, for example 1-2 cm, to provide a shock-absorbing effect in the event the cover is forced backward for one reason or another. As shown in FIGS. 4 and 5, the cover rests against the abutment at a point somewhat spaced from the pivot.

The figures show the preferred embodiment in which two spaced pivot pins support the cover. A similar attachment comprises only one pivot pin, for example near the center of the rear edge of the housing.

A paper receptacle channel 40, mounted to the underside 34 of cover 30 near the pivoting edge, engages and/or supports the lower edge of a piece of paper (not shown) laid against the underside 34 of cover 30. An extension tab 42, pivotable around pin 44, may be extended from its "home" position parallel to the edge of cover 30, or may be extended upwards to support a longer sheet of paper, as shown in phantom in FIGS. 4 and 5. The channel-like paper receptacle 40 also functions as a spacer, holder cover 30 slightly above keys 36 when the cover is down.

The extension tab is frictionally held by a relatively tight fit with pin 44. A resilient washer may also be employed to hold the tab in place. It is also possible to provide a dentent structure adjacent the extension tab, for example one or more raised bumps, causing the tab to lock in selected positions against the bumps.

The cover 30 is shown to be removable in FIG. 6, where cover 30 is shown separated from the attachment member 36. FIG. 6 shows the underside of cover 30, including attached pivot blocks 50, into which pivot pins may be laterally inserted. Paper receptacle channel member 40 is also rigidly attached.

Clear or smoked plastic sheets, for example that known as plexiglass, can be used for the cover 30. The needed rigid attachments can be made by known adhesives, or the so-called attachments can be integrally formed in the body of material.

The pivot pins are supported by attachment devices engaging the keyboard housing. Two alternative attachment means are shown in FIGS. 2, 4 and 3, 5 respectively. In the device of FIGS. 2 and 4, cover 30 is pivotable between its first, protective position 62, and its second, upward copy-holding position 64, by a pivot pin supported on an attachment member including a spring clip 58. Clip 58 may be of resilient, springy metal, or may be a resilient plastic. Abutment part 56 is affixed to spring clip 58, and to an attachment block. Spring clip 58 engages the keyboard housing 20 by its top and bottom.

Should the user desire to remove cover 30, as shown in FIG. 6, cover 30 can be merely pulled perpendicularly upward from keyboard housing 20, whereupon the pivot pins 54 are pulled laterally from at least one of blocks 50, 52.

At least one of blocks 50, 52 preferably is slotted for lateral placement of the pivot pin. The blocks can be slotted slightly more narrowly than the diameter of the pins, the slot ending in a bore of diameter equal to the pin. In this manner, the pin is removable but stays put when inserted.

Spring clip 58, carrying abutment part 56 and blocks 52, remain on the keyboard, and can be removed if the user so desires, by resiliently unclasping spring clip 58 from the rear of keyboard housing 20. As shown in FIG. 2, spring clip 58 engages the rear of the keyboard housing. As shown in FIG. 3, in an alternative embodiment, the attachment means can be mounted entirely on the surface of the keyboard housing.

As shown in FIG. 3, a separable portion of the attachment means can be adhesively affixed to the surface of the keyboard. A portion of hook and pile tape 68 is glued directly to the surface and side of the housing 20. An upper portion of the attachment device, including a matching hook and pile strip 66, is pressed against strip 68, to mount cover 30 to the keyboard housing. Inasmuch as a portion of the attachment member, namely hook and pile strip 66, can be removed from the keyboard housing 20, the embodiment of FIGS. 3 and 5 need not include slotted pivot blocks 50, 52, for laterally-insertable pivot pins.

With reference to FIGS. 3 and 5, the hook and pile fasteners extend over the side of keyboard housing 20, rather than over the rear. The relatively-resilient connection of hook and pile fasteners across strip 66, 68, as shown in FIGS. 3 and 5, provides a further shock-absorbing effect, absorbing force and/or vibration from cover 30 in the event that the cover is flung backwards against abutment part 56.

The device of the invention has the dual functions of a dust cover and copyholder. Unlike copyholders which are associated with platen-bearing machines, the dust cover is mounted in the optimal location, namely, immediately to the rear of the keys. Nevertheless, the cover does not obscure the finished printed product, as would occur in a typewriter. The cover, which is coextensive with the upper surface of the keyboard, does not tend to hold in heat generated by integrated circuits and the like, and may be kept in place on the keyboard housing when the device is operating. Moreover, open edges at the area of extender tab 42, and adjacent the pivot blocks 50, 52, allow limited air circulation in any event, while protecting from accumulation of dust.

The device of the invention is capable of variations which will now be apparent to persons skilled in the art and advised of this disclosure. Reference should be made to the appended claims rather than the foregoing specification as indicating the true scope of the invention.

What is claimed is:

1. A cover and copyholder for a self-standing keyboard housing connected to and relatively movable in relation to a screen, the keyboard housing includes an array of keys on an upper working surface, comprising:
   a planar cover and copyholder body movably mounted to and movable in relation with the keyboard housing, said cover and copyholder body movable between
   a first portion in which said cover and copyholder body protectively overlies the upper working surface of the keyboard housing and the array of keys for covering purposes, and
   a second position in which said cover and copyholder body projects upward and rearwardly for copyhold purposes,
   said cover and copyholder body including at least a portion of a hinge means for pivoting said cover and copyholder body from said first position to said second position or from said second position to said first position,
   said hinge means including a generally horizontal pivot axis adjacent a rear edge of the keyboard housing; and,
   said cover and copyholder body including a top surface and an underside surface and a receptacle means for supporting paper against said underside surface when said cover and copyholder body is in said second position, said receptacle means positioning the paper immediately adjacent and to the rear of the keyboard housing and
   attaching means for said cover and copyholder body removably mountable on the keyboard housing, said attachment means connected to the keyboard housing, said attaching means including the other portion of said hinge means.

2. The apparatus of claim 1, wherein said cover and copyholder body includes a spacer attached to said cover and copyholder body, said spacer constructed and arranged and operable in said first position to space the said cover and copyholder body above said working surface of the keyboard housing.

3. The apparatus of claim 1, further comprising
   an extension arm movably mounted on said cover and copyholder body and extendible from an upward edge of said cover and copyholder body in said second position for holding long sheets of paper.

4. The apparatus of claim 1, wherein said attachment means includes an attachment member rigidly attachable to the housing and said hinge means pivotally joining the attachment member and said cover and copyholder body, said attachment member having an abutment supporting said cover and copyholder body in the second position, said abutment having a resilient extension operable to stop rotation of said cover and copyholder body at the second position.

5. The apparatus of claim 4, wherein said attachment member includes a spring clip resiliently attachable to the keyboard housing.

6. The apparatus of claim 4, wherein said attachment member includes a hook and pile fastener tape adhesively affixed to the keyboard housing.

7. The apparatus of claim 4, wherein said hinge means comprises at least one hinge pin, said pin being removable from at least one of said cover and copyholder body and said attachment member.

8. The apparatus of claim 7, wherein said hinge pin is removably inserted in said at least one of said cover and copyholder body and said attachment member is a slot dimensioned to frictionally engage the hinge pin.

9. The apparatus of claim 1, wherein said receptacle means comprises a channel member being mounted adjacent said hinge means and having an upwardly-direct opening in the second position.

10. A cover and copyholder for a keyboard housing, comprising:
    a cover body to be rested over the keyboard housing, the cover body having edges for contacting the housing, and a planar portion spaced above the housing by the edges, the cover body being pivotable upwards from the housing around a pivot pin at a rear edge of the keyboard housing;
    paper support means mounted on an underside of the planar portion, the paper support means including a channel for engaging lower edge of a paper, the channel being mounted adjacent the pivot pin and operable to hold the paper above the housing when the cover body is pivoted upwards, and a movable extension tab for supporting an upper portion of the paper, the extension tab being rotatably affixed at an edge of the cover body opposite from the channel; and,
    mounting means including a clasp removably attachable to the housing, the mounting means having an abutment extending upwards from the clasp and a hinge block pivotally attached to the cover body by the pivot pin.

* * * * *